Sept. 5, 1967    K. DAMSGAARD    3,339,870
MULTIPLE CABLE SUPPORT

Filed July 19, 1966    2 Sheets-Sheet 1

*INVENTOR.*
KJELD DAMSGAARD
BY *Donald R. Johnson*
ATTORNEY

Sept. 5, 1967  K. DAMSGAARD  3,339,870
MULTIPLE CABLE SUPPORT
Filed July 19, 1966  2 Sheets-Sheet 2

INVENTOR.
KJELD DAMSGAARD
BY Donald R. Johnson
ATTORNEY

United States Patent Office 3,339,870
Patented Sept. 5, 1967

3,339,870
MULTIPLE CABLE SUPPORT
Kjeld Damsgaard, Wallingford, Pa., assignor to Sun Shipbuilding & Dry Dock Company, Chester, Pa., a corporation of Pennsylvania
Filed July 19, 1966, Ser. No. 566,376
1 Claim. (Cl. 248—68)

ABSTRACT OF THE DISCLOSURE

An angle member, used for supporting a run of plural cables, has in one wall thereof a plurality of band-receiving apertures through a pair of which a flexible band passes to encircle the cables of the run and draw them tightly into engagement with the upper surface of the member, the band passing underneath the wall of the angle against which the cables are drawn. The angle member also has smaller apertures in its walls for fastening it to other similar angle members and/or to external supporting structure.

---

This invention relates to supports for firmly and rigidly attaching conductors of any size, and either of single or multiple sizes, in any prearranged geometrical array, to a fixed structure.

One previous device for supporting cables consists of clamps for hanging each cable individually, with a different size clamp for each cable size. This device is obviously unsatisfactory for multiple cable runs.

Another device has been used in the past for multiple cable runs, comprising a strap contoured to fit a particular run of different sized cables. Since there are no standard arrangements of diffeent sized cables, the strap must be designed and contoured for each particular cable arrangement. This is of course uneconomical.

In an attempt to avoid the disadvantages of the devices previously described, and to provide some degree of versatility, a strapping device has been proposed, in which cables are anchored by means of a flexible strap to a tubular bracket having a flat side. This device is satisfactory where all the cables are of the same size, or where the geometrical arrangement is such that the larger cables are in the center of the cable array and the cable sizes do not vary too much. However, it is unsatisfactory when small cables are in the center of the cable array; also, this particular bracket must be of the correct length taking into account the number and the size of the cables to be supported. Moreover, it is not capable of accommodating an extra cable, in the event that such must be added.

According to this invention, there is provided a single support of a type that will accommodate any number of cables of any size, in any geometrical arrangement. This eliminates the need for the large, costly, and inconvenient stock of hangers or supports previously found necessary in order to accommodate the many possible cable arrays. Much confusion and labor time is saved or eliminated in purchasing and warehousing of stock, and in installation, since it is no longer necessary to have a particular bracket matching each particular multiple cable run installed.

More particularly, this invention utilizes a rigid angle-shaped member having its two edges rolled inwardly and provided with a first series of spaced apertures in one of its walls and a second series of spaced apertures in the other of its walls; the angle iron can be cut to any desired length to form a horizontally-extending cable support, and several of these cable supports may be held in parallel, spaced relation by means of other pieces cut from the same angle iron stock and forming vertical supporting members. Certain of the apertures are larger, to accommodate a flexible metal band which passes therethrough and encircles the cables to be supported on the horizontally-extending supports. For supporting a cable run, a plurality of these horizontally-extending supports are provided, one support being located every eighteen inches or so along the length of the run. For certain arrays of cables, a band-retaining member or clip can be employed to properly position the band, this clip being mounted in one of the larger apertures. The smaller apertures in the angle iron can accommodate mounting bolts.

A detailed description of the invention follows, taken in conjunction with the accompanying drawings, wherein.

Figure 1:
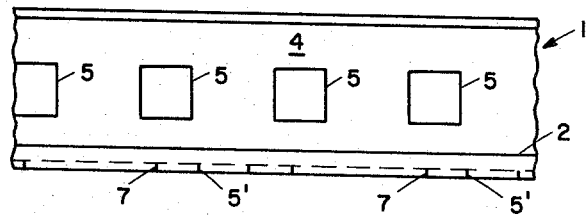
FIG. 1 is a plan view of a length of angle iron according to the invention, looking at the inside thereof.
Figure 2:
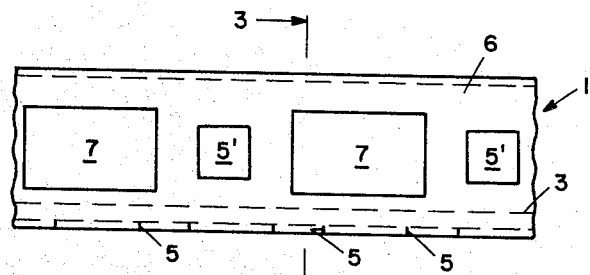
FIG. 2 is a front view of the angle iron of FIG. 1.
Figure 3:
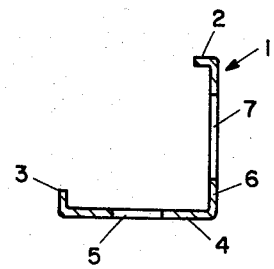
FIG. 3 is a section taken on line 3—3 of FIG. 2 and looking in the direction of the arrows.

First referring to FIGS. 1–3, a rigid angle-shaped member 1, which may be cut to any desired length to form a cable support, has its two free edges rolled in approximately ⅛″ as indicated at 2 and 3 (FIG. 3), to provide greater structural strength and to form smooth rounded surfaces, thereby preventing chafing of the conductors or cables to be supported. The angle iron 1 may be 1¼″ x 1¼″ x .093″ thick, by way of example.

One wall 4 of member 1 has therein a plurality of uniformly spaced apertures 5 (e.g., ⁵⁄₁₆″ square apertures, on one-inch centers) through any one or more of which mounting bolts may pass for mounting of the support; this will be described further hereinafter. This series of apertures 5 provides maximum mounting possibilities (for various cable arrays), and in addition makes it possible to add additional cables when desired (this will be further explained hereinafter).

The other wall 6 of member 1 (which wall lies at right angles to wall 4) has therein a plurality of uniformly spaced apertures 7 each sized (in width) to permit the passage therethrough of a flexible band 19 (FIG. 4); for example, apertures 7 may be ⅝″ x 1″ rectangular apertures, on two-inch centers. In addition, wall 6 has therein a plurality of uniformly spaced apertures 5' of the same size as apertures 5, located equidistantly between apertures 7.

Figure 4:
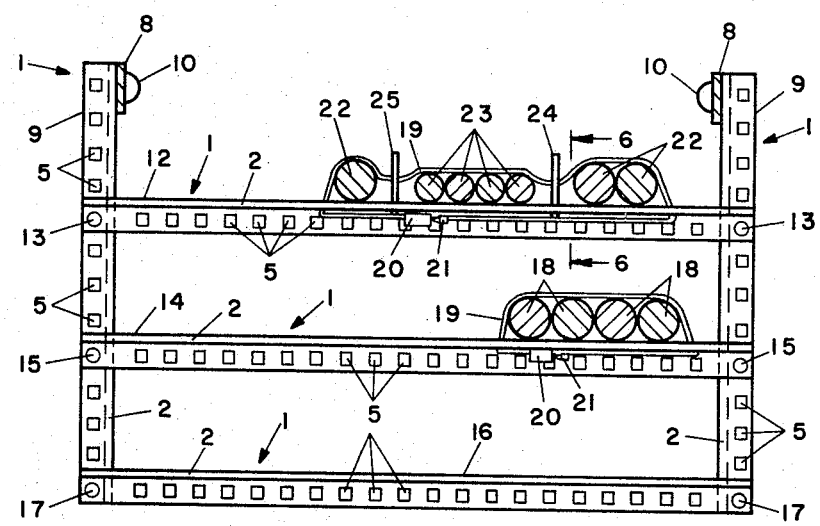
FIG. 4 is an end view of a typical array of cable supports (forming wireways) according to the invention.
Figure 5:
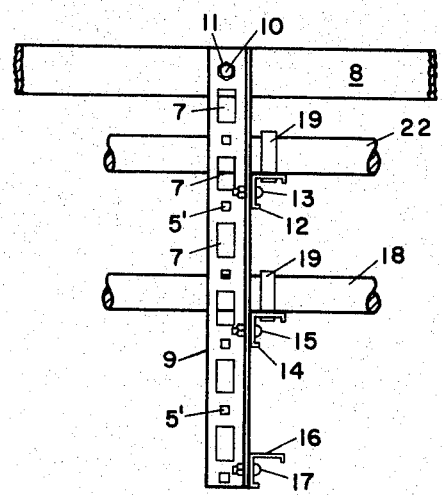
FIG. 5 is a side view of the array of FIG. 4.

FIGS. 4 and 5 illustrate a plurality of cable supports using the angle iron 1 previously described and forming wireways, for supporting a plurality of cable runs. It will be appreciated that supporting arrangements such as that illustrated are provided at suitable intervals (for example, eighteen inches apart) along the lengths of the cable runs. Purely by way of example, three horizontally-extending supports are illustrated; it is pointed out that any number of such supports may be utilized, as called for by the particular conditions.

For mounting the three wireways to fixed supporting structure, two parallel horizontally-extending runner bars 8 (for example, ¼″ x 1½″ in cross-sectional dimensions) are secured as by welding to the deck beams of a ship; these runner bars are spaced apart a suitable distance, such as about eighteen inches. At each cable-supporting location, two pieces of the angle iron 1 previously described are used as parallel, vertically-extending uprights 9, with one of these uprights being secured to each respective one of the runner bars 8. The uprights 9 extend downwardly from the respective runner bars, and are secured thereto by means of bolts 10 (for example, ⁵⁄₁₆″ carriage bolts) each of which passes through a hole provided in the runner bar 8 and through one of the square holes 5' in the respective angle-iron upright 9. For ease of illustration, the bolts 10 are shown somewhat enlarged in FIGS. 4 and 5. A nut 11 threaded on each bolt 10 firmly secures each upright 9 to its corresponding runner bar 8.

A piece of the angle iron 1 (about 20" in length, for example) forms an upper horizontally-extending support 12 for cables, that is, an upper wireway. Support 12 extends horizontally at right angles to both the uprights 9 and to the runner bars 8, with its wall 6 extending transversely to the axis of the cable run; the axis of the cable run is parallel to the length dimension of the runner bars 8. Support 12 is located a suitable distance below the upper end of uprights 9; for example, the lower edge of the angle iron forming support 12 may be five inches below the upper end of the uprights. Support 12 is placed so that the outer face of its wall 4 is in engagement with the outer faces of the similar walls of uprights 9, at the ends of the support (see FIG. 5); the two ends of support 12 are secured respectively to the two uprights 9 by means of two bolts 13 (of the same type as bolts 10) each one of which passes through a square aperture 5 in support 12 and an aligned square aperture 5 in a respective upright 9. Nuts are screwed onto the bolts 13 (see FIG. 5) to cause support 12 to be brought into rigid engagement with uprights 9.

A piece of the angle iron 1 forms an intermediate horizontally-extending support 14 for cables, that is, an intermediate wireway. Support 14 is similar in all respects to support 12, previously described, and is similarly disposed and mounted, being positioned below support 12, in parallel, spaced relation thereto. By way of example, the lower edge of the angle iron forming support 14 may be four inches below the lower edge of the angle iron forming support 12. The two ends of support 14 are secured respectively to the two uprights 9 by means of two bolts 15 (of the same type as bolts 10) each one of which passes through a square aperture 5 in support 14 and an aligned square aperture 5 in a respective upright 9. Nuts are threaded onto the bolts 15, being tightened to bring support 14 into rigid engagement with uprights 9.

A piece of the angle iron 1 forms a lower horizontally-extending support 16 for cables, that is, a lower wireway. Support 16 is similar in all respects to support 12, previously described, and is similarly disposed and mounted, being positioned below support 14, in parallel, spaced relation thereto. By way of example, the lower edge of the angle iron forming support 16 may be four inches below the lower edge of the angle iron forming support 14. The two ends of support 16 are secured respectively to the two uprights 9 by means of two bolts 17 (of the same type as bolts 10) each one of which passes through a square aperture 5 in support 16 and an aligned square aperture 5 in a respective upright 9. Nuts are threaded onto the bolts 17, being tightened to bring support 16 into rigid engagement with uprights 9.

In the intermediate wireway provided by support 14, there is illustrated a group of cables 18 of the same diameter which form what is generally referred to as a cable run. This cable run must be most firmly and securely held when any particular vibration or concussion can be anticipated. Cables 18 engage the external surface of wall 6 of the support, and extend transversely to the length of this wall.

A flexible non-magnetic metal band 19 extends lengthwise along the internal surface of wall 6 of the support 14, passes through a pair of apertures 7 in this wall (which apertures, as previously noted, have sufficient width to permit the passage therethrough of this band), and encircles the cables 18. The band 19 places the conductors or cables 18 under compression. Band 19 may be of the type disclosed in Patents Nos. 2,386,629 and 2,395,273, and is a length of flat metal band (9/16" in width, for example, and made of resilient stainless steel) which is preferably preformed into a circular configuration. A housing 20 which provides a screw casing is rigidly secured to band 19 near one end thereof, as by means of a saddle (not shown). A screw 21 is mounted for rotation in housing 20, this screw having at its inner end, inside housing 20, a continuous spiral thread (not shown) integrally formed therewith. The band 19 is provided with a plurality of longitudinally spaced transversely extending slots or elongated apertures (not shown), beginning at the end of band 19 opposite to housing 20; these last-mentioned slots are so spaced and positioned on an incline transversely as to conform to and receive the spiral thread of the tightening (tensioning) and holding screw 21. The end walls of the housing 20 are spaced away from the saddle sufficiently to accommodate the overlapping (free) end of the band 19.

In use, by turning screw 21 counterclockwise sufficiently, the free or outer end of band 19 will be backed out of the housing 20, permitting the band to be looped over the cables 18, through a pair of apertures 7 in the wall 6 of support 14, and along the internal surface of this wall 6. The outer end of the band 19 may then be reinserted in the housing 20 into cooperative relation with the spiral thread therein, whereupon rotation of the screw 21 in the clockwise direction will draw the band through the housing to tighten or tension the band about the cable run, thereby drawing the band into engagement with those ends of the apertures 7 (referring, of course, to the particular pair of such apertures through which the band passes) that are nearest to the cables 18 and with the internal surface of wall 6 of support 14, and compressively binding the cable run to the external surface of wall 6 of support 14. The complete wrap-around of the flexible member or band 19 prevents impact and shock from dislodging the conductors 18 being supported.

The angle iron 1, being open on two sides (see FIG. 3), makes the rectangular holes or apertures 7 for inserting of the band 19 readily accessible, regardless of the length of the angle-iron support 14. The perforated design of the angle iron 1 saves considerable weight; at the same time, the angle-iron supports 12, 14, and 16, as well as the angle-iron uprights 9, have adequate strength and impact resistance. Weight saving is important aboard ship; while the saving of weight of cable supports appears slight, it must be remembered that cables aboard ship must be supported at 18-inch intervals, so as a result a rather large number of cable supports are ordinarily used in the wiring of a ship.

The cable support of this invention is quite versatile, as a result of the provision of the plurality of apertures 5, 5′, and 7. Thus, with the support of this invention, it is easy to make changes in the cable arrangements, or to add cables, after the cable support has been installed.

In the upper wireway provided by support 12, there is illustrated a group of cables 22 and 23 of different diameters forming another cable run; in this run, the smaller-diameter conductors 23 are spaced between the larger-diameter conductors 22. In this case, a modified support assembly, including one or more specially-designed band-retaining members or clips, can be used. If no band-retaining members or clips were used with the cable run 22, 23, there would be one or more loose cables under the band and it would be impossible to satisfactorily fasten the run 22, 23 to a support such as 12 by means of a flexible metal band.

A pair of band-retaining members or clips 24 and 25 may be utilized for the run 22, 23, one at each end of the group of smaller-diameter cables 23, the function of these clips being to guide the band 19 to, and retain the band in, a position closer to the angle-iron support 12, such that the band contacts the smaller-diameter cables 23 with a compressive force sufficient to hold them securely against the cable-engaging surface of support 12.

Figure 6:
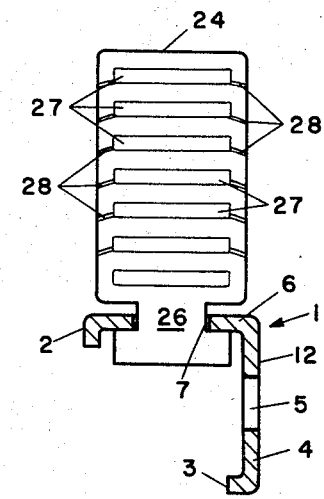
FIG. 6 is a section taken on line 6—6 of FIG. 4, on an enlarged scale, but omitting the band and cables.

As shown more particularly in FIG. 6, a band-retaining member 24, which is formed from thin steel plate such as sixteen-gauge galvanized sheet metal, has at one end an integral T-shaped tab 26 the leg of which has a width just slightly less than the width of the rectangular apertures 7, so that the leg of the T can extend through one of these apertures and the head of the T will engage the material of the inner (lower) surface of wall 6 at opposite points located on the longer sides of the aperture 7, as illustrated in FIG. 6. The width of the head of the T 26 is less than the length of apertures 7, so that the head of the T can be inserted through one of the apertures 7 and then the member 24 can be rotated bodily, about a vertical axis, through 90° to bring it to the mounting position illustrated in FIG. 6. The member 25 is exactly similar to member 24, and the former can be mounted in an aperture 7 in the same manner as member 24. It should be pointed out that, in use, member 24 is mounted in the rectangular hole 7 that is nearest to the right-hand end of the group of conductors 23, while member 25 is mounted in the rectangular hole 7 that is nearest to the left-hand end of the group of conductors 23. It should be obvious that, when members 24 and 25 have been mounted within their respective apertures 7, but before the band 19 has been tightened in such members, they can be slid to any desired positions along the lengths of their respective apertures 7.

Each of the band-retaining members 24, 25 has therein a plurality (for example, seven) of spaced, parallel band-receiving apertures 27 through a selected one of which band 19 can pass (see FIG. 4). The particular one of the apertures 27 selected for reception of band 19 (i.e., the particular aperture 27 through which the band is threaded after the members 24, 25 and the cables 22, 23 have been properly positioned) depends upon the diameter of the cable 23 which is immediately adjacent thereto. In general, the band 19 is threaded through an aperture 27 spaced from support 12 a distance somewhat less than the diameter of cable 23, so that when the looping of band 19 has been completed and this band is tightened or tensioned (in the manner described hereinabove), it will be brought into tight engagement with cables 23. It may be seen that the tightening of this band also brings the head of the T 26 into firm engagement with the lower surface of wall 6 of support 12, thus tightening members 24 and 25 in position in their respective apertures 7.

The material of members 24 and 25 is scored at the two ends of each of the apertures 27 (except the lowermost aperture) and even with the lower edges of such apertures, as indicated at 28. These score lines or stamped depressions enable the unused or excess outer (upper) portion of each member to be broken off with pliers and discarded, leaving smooth edges with rounded corners.

It is pointed out that other arrays of cables, or other cable runs (i.e., other than those illustrated) may be supported by the assembly of wireways shown in FIGS. 4 and 5; in particular, a cable run would ordinarily be installed in the lower wireway formed by support 16, although none is shown in the drawings.

The invention claimed is:

A support for a run of plural cables, comprising an elongate rigid angle-shaped member adapted to extend transversely to the axis of a run of plural cables and having one wall of said angle adapted to support cables of said run with the cables lying atop the upper, external surface of said one wall, said one wall having therein a plurality of spaced apertures each sized to permit the passage therethrough of a flexible band; a length of flat flexible metal band extending lengthwise along the lower, internal surface of said one wall, passing through a pair of said apertures, and encircling the cables of said run, and band clamping means for securing together the ends of said band, said clamping means being arranged to permit tensioning of the band about the cable run whereby said band is drawn into engagement with the lower, internal surface of said one wall and said cable run is compressively bound to its said external surface; said one wall of said angle having therein, between each respective adjacent pair of said apertures, a smaller opening capable of accommodating a fastening means for fastening the angle member to external supporting structure, and the other wall of said angle having therein a plurality of spaced openings each capable of accommodating fastening means for fastening the support to external supporting structure.

References Cited
UNITED STATES PATENTS

| | | | |
|---|---|---|---|
| 2,595,702 | 5/1952 | Prevost | 239—513 |
| 2,939,664 | 6/1960 | Wesseler | 248—68 |

FOREIGN PATENTS

| | | |
|---|---|---|
| 240,764 | 12/1959 | Australia. |
| 621,487 | 11/1935 | Germany. |
| 350,087 | 6/1931 | Great Britain. |

CHANCELLOR E. HARRIS, *Primary Examiner.*

CLAUDE A. LE ROY, *Examiner.*